United States Patent
Matsubara et al.

(10) Patent No.: US 8,350,713 B2
(45) Date of Patent: Jan. 8, 2013

(54) NUMERICAL CONTROLLER HAVING A FUNCTION FOR DETERMINING MACHINE ABNORMALITY FROM SIGNALS OBTAINED FROM A PLURALITY OF SENSORS

(75) Inventors: Shunsuke Matsubara, Minamitsuru-gun (JP); Yasusuke Iwashita, Minamitsuru-gun (JP); Shinichi Horikoshi, Minamitsuru-gun (JP); Akira Hirai, Minamitsuru-gun (JP); Hiroyasu Sato, Minamitsuru-gun (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 252 days.

(21) Appl. No.: 12/832,209

(22) Filed: Jul. 8, 2010

(65) Prior Publication Data
US 2011/0063122 A1    Mar. 17, 2011

(30) Foreign Application Priority Data
Sep. 11, 2009  (JP) .................................. 2009-210182

(51) Int. Cl.
*G08B 21/00*     (2006.01)
(52) U.S. Cl. ...................... 340/679; 340/691.6; 340/461
(58) Field of Classification Search .................. 340/679, 340/463, 464, 461, 566–567, 601–602, 680, 340/683, 691.6, 692
See application file for complete search history.

(56) References Cited

U.S. PATENT DOCUMENTS

| | | | | |
|---|---|---|---|---|
| 3,530,946 | A | * | 9/1970 | Major .............................. 172/96 |
| 3,820,859 | A | * | 6/1974 | Brown .......................... 310/90.5 |
| 2003/0120466 | A1 | * | 6/2003 | Liu et al. ........................ 702/188 |
| 2008/0177403 | A1 | * | 7/2008 | Masuya et al. .................. 700/90 |

FOREIGN PATENT DOCUMENTS

| | | |
|---|---|---|
| JP | 4-311206 | 11/1992 |
| JP | 6-288796 | 10/1994 |
| JP | 2008-176559 | 7/2008 |
| JP | 2008-234131 | 10/2008 |
| JP | 2009-175793 | 8/2009 |

OTHER PUBLICATIONS

Japanese Notice of Reasons for Refusal mailed Nov. 16, 2010 issued in JP Application No. 2009-210182 (including a partial translation thereof).

* cited by examiner

*Primary Examiner* — Daniel Previl
(74) *Attorney, Agent, or Firm* — Drinker Biddle & Reath LLP

(57) ABSTRACT

Signals from a plurality of sensors (vibration sensors, temperature sensors, and humidity sensors) disposed at places on a machine are input through a communication circuit to a numerical controller that controls the machine. The numerical controller uses vibration information, temperature information and humidity information obtained from these sensors to determine whether the machine is in an abnormal state.

2 Claims, 5 Drawing Sheets

NUMERICAL CONTROLLER HAVING A FUNCTION FOR DETERMINING MACHINE ABNORMALITY FROM SIGNALS OBTAINED FROM A PLURALITY OF SENSORS

RELATED APPLICATION DATA

This application claims priority under 35 U.S.C. §119 and/or §365 to Japanese Application No. 2009-210182 filed Sep. 11, 2009, the entire contents of which are incorporated herein by reference.

BACKGROUND OF THE INVENTION

1. Field of the Invention

The present invention relates to a numerical controller for controlling a machine and, more particularly, to a numerical controller that has a means for monitoring signals from a plurality of sensors that monitor states at individual places of a machine so as to determine whether the states at these places and the numerical controller are normal or abnormal from detected information obtained from the plurality of sensors and from internal information about the numerical controller.

2. Description of the Related Art

The spindle of a machine tool and a robot arm may unexpectedly strike against an object due to program error or an operator mistake. If this type of strike occurs, the structure itself of the spindle or robot arm or the motor for driving the spindle or robot arm causes a failure. The failure then affects machining precision and operation precision. Accordingly, if a strike occurs, it is desirable to stop and check the machine tool or robot.

To locate the cause of a strike, Japanese Patent Application Laid-Open No. 2008-176559, for example, discloses a technique by which when a signal detected by a vibration sensor becomes large, information about the internal speed and position of the numerical controller is also recorded.

In the summer and rainy season during which humidity is high, if an alarm occurs when a machine is turned on in the morning during which temperature is low, it has been determined from experience that an abnormal condition might have been caused by dew condensation.

In the technology disposed in Japanese Patent Application Laid-Open No. 2008-176559 described above, however, occurrence of a strike is just determined if a difference produced by a signal detected by any one of a plurality of vibration sensors disposed on the machine exceeds a preset threshold, and detected information obtained from the plurality of sensors and the internal information about the numerical controller are not combined in the process so as to determine whether an abnormal condition has occurred in the machine. That is, the fact that the machine has caused a strike can be detected, but the cause of the alarm cannot be located.

SUMMARY OF THE INVENTION

An object of the present invention is to provide a numerical controller having a function for determining reliably, from internal information about the numerical controller and detected information obtained from a plurality of sensors, whether a machine is normal or abnormal.

To achieve the above object, the numerical controller according to the present invention has a plurality of sensors disposed at individual places of the machine so as to monitor states at these places and an abnormality determining unit for determining whether the machine is normal or abnormal from detected information obtained from at least one of the plurality of sensors as well as internal information about the numerical controller so that whether the machine is normal or abnormal can be determined from signals obtained from the plurality of sensors.

The plurality of sensors are vibration sensors, temperature sensors, and humidity sensors. The internal information about the numerical controller may be at least one of information about the loads of a spindle and feed axes, alarm information about a motor driving unit, and alarm information about the numerical controller.

The plurality of sensors are temperature sensors and humidity sensors or are absolute humidity sensors; one temperature sensor and one humidity sensor are placed close together at a place on the machine or the absolute humidity sensors are disposed at the individual places on the machine. The internal information about the numerical controller is alarm information about the motor driving unit or alarm information about the numerical controller. The abnormality determining unit has a dew condensation occurrence inferring means that uses detected temperature information obtained from the temperature sensors, detected humidity information obtained from the humidity sensors, and a relational equation for temperature and the amount of saturated vapor or uses absolute humidity information obtained from the absolute humidity sensors so that a difference in the amount of water vapor per unit volume in air is obtained between when the machine is turned on and when the machine is turned off as a differential amount of water vapor, and then infers occurrence of dew condensation at a time of power-on from the obtained differential amount of water vapor. If the dew condensation inferring means infers occurrence of dew condensation when the alarm information about the motor driving unit or the alarm information about the numerical controller is generated, it can be determined that the place where the relevant temperature sensor and humidity sensor or the relevant absolute humidity sensor is disposed is abnormal and the dew condensation can be handled as a candidate cause of the alarm information.

The plurality of sensors are a plurality of vibration sensors, and the internal information about the numerical controller is alarm information about the motor driving unit or alarm information about the numerical controller. The abnormality determining unit can have a means for determining whether there was a situation in which an electric signal connection cable was likely to cause poor connection due to vibration when the alarm information about the motor driving unit or the alarm information about the numerical controller was generated, from detected vibration information obtained from the plurality of vibration sensors and the alarm information.

The present invention can provide a numerical controller having a function that can determine reliably, from internal information about the numerical controller and detected information obtained from a plurality of sensors, whether a machine is normal or abnormal by associating the detected information obtained from the plurality of sensors with the internal information about the numerical controller.

BRIEF DESCRIPTION OF THE DRAWINGS

The purposes and advantages of the present invention, including those described above, will be clarified by referring to the attached drawings in combination with the description of the embodiments described below. Of these drawings.

DETAILED DESCRIPTION OF THE PREFERRED EMBODIMENTS

Figure 1:
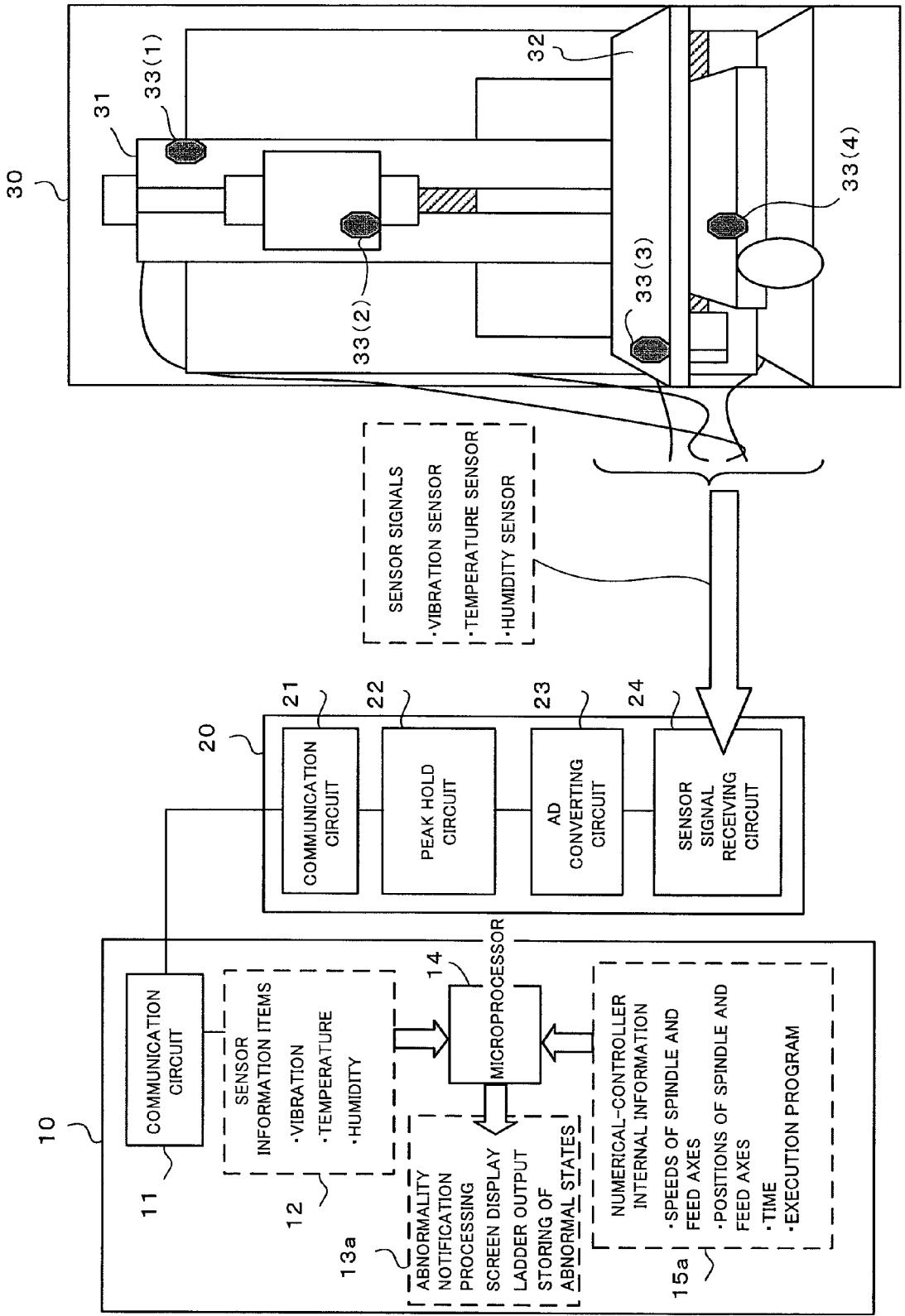
FIG. 1 is a block diagram illustrating an embodiment of a numerical controller according to the present invention that determines whether a machine is normal or abnormal, from signals detected by a plurality of sensors disposed at individual places of the machine.

FIG. 1 is a block diagram illustrating an embodiment of a numerical controller according to the present invention that determines whether a machine is normal or abnormal, from signals detected by a plurality of sensors disposed at individual places of the machine.

A plurality of sensors including sensors 33(1), 33(2), 33(3), 34(4), and so on are disposed at a plurality of places such as on the column 31 and table 32 of a machine 30. These sensors measure vibration, temperature, humidity, and other physical quantities. A combination of a plurality of types of sensors that measure these physical quantities may be disposed at a single place on the machine 30. Alternatively, sensors for measuring different physical quantities may be disposed at different places of the machine.

Signals from the plurality of sensors disposed at the different places of the machine 30 to measure various types of physical quantities, that is, signals from vibration sensors, signals from temperature sensors, and signals from humidity sensors, are input to a sensor signal receiving circuit 24 in a sensor signal relay unit 20. Detected signals obtained from these sensors are analog, so they are converted by an A/D converting circuit 23 into digital signals. The sensor-detected signals, which have been converted into digital signals, are input to a numerical controller 10 through a peak hold circuit 22 and a communication circuit 21. The peak hold circuit 22 is used to hold a peak value of vibration obtained from the vibration sensors because the signals from the vibration sensors excessively vary.

The numerical controller 10 includes a microprocessor 14 that retrieves a plurality of information items 12 (vibration information, temperature information, and humidity information) through a communication circuit 11 and also retrieves numerical-controller internal information 15a. The microprocessor 14 uses the plurality of information items 12 and numerical-controller internal information 15a to perform abnormality determination and abnormality notification, display an abnormal state on a display unit of the numerical controller 10, provide ladder output used to stop the machine 30, and store a result of the abnormality determination into a memory in the numerical controller 10. The numerical-controller internal information 15a includes speed information and positional information about a spindle and feed axes, time information, and executed program information.

Figure 2:
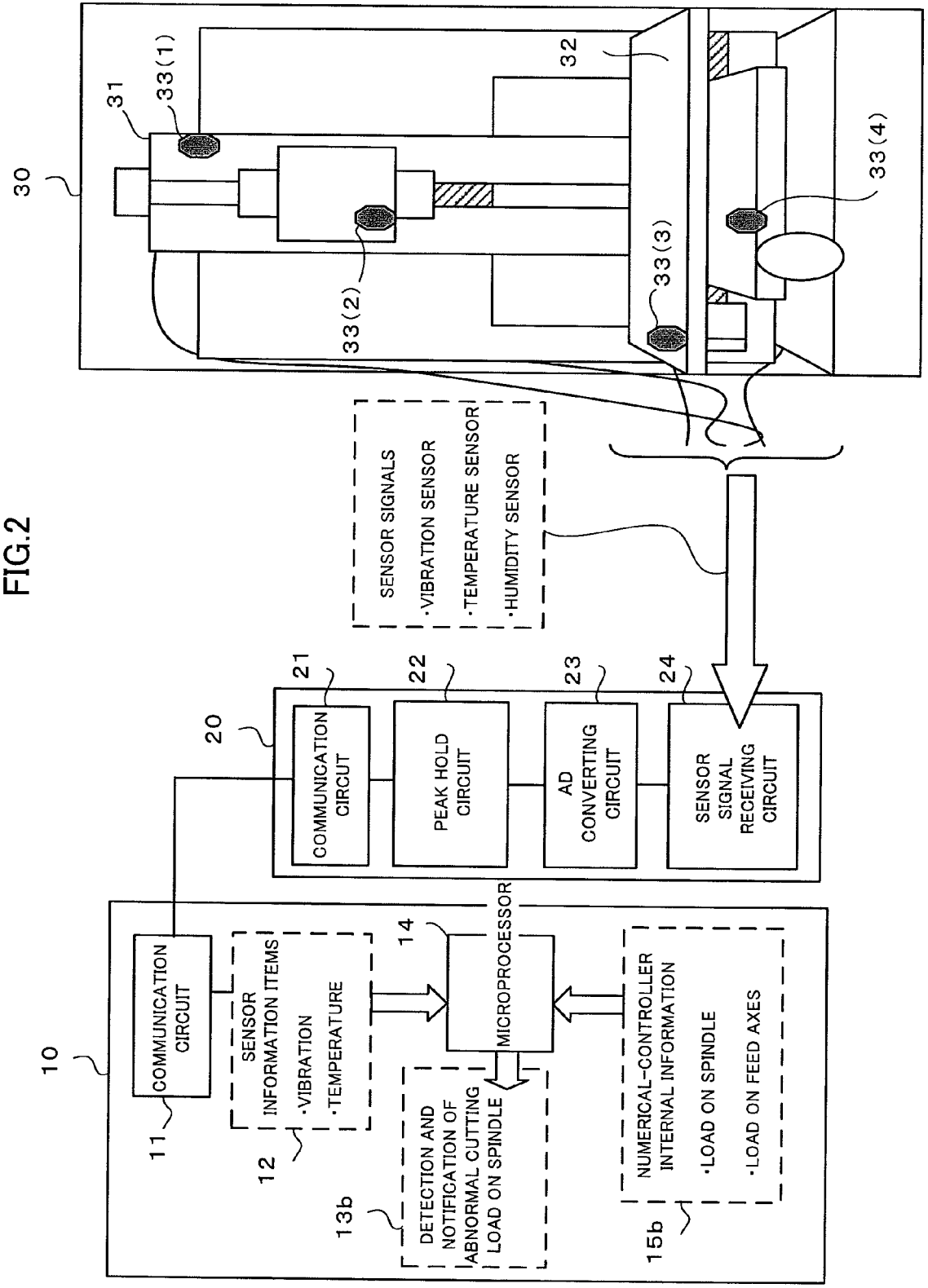
FIG. 2 illustrates a case in which internal information about the numerical controller is any one of information about the loads of a spindle and feed axes, alarm information about a motor driving unit, and alarm information about the numerical controller.

FIG. 2 illustrates a case in which numerical-controller internal information 15b is any one of information about the loads of the spindle and feed axes, alarm information about the motor driving unit, and alarm information about the numerical controller.

A plurality of sensors, which are vibration sensors, temperature sensors, and humidity sensors, are disposed at individual places of the machine 30. A signal detected by each sensor, which indicates a physical quantity, is input to the sensor signal relay unit 20. Signal processing is carried out on the signal as described above with reference to FIG. 1, after which the signal is input to the numerical controller 10.

Out of information retrieved from the sensor signal relay unit 20, the numerical controller 10 (which includes the microprocessor 14) uses vibration information sent from the vibration sensors and temperature information sent from the temperature sensors. The numerical controller 10 uses information about the loads of the spindle and feed axes as the numerical controller internal information 15b.

If a workpiece (not shown) is cut abnormally by a tool attached to the spindle and thereby the machine 30 vibrates or generates heat, the fact can be detected by the vibration sensors and temperature sensors. Signals detected by the vibration sensors and temperature sensors are sent to the numerical controller 10 through the sensor signal relay unit 20.

The microprocessor 14 in the numerical controller 10 retrieves the vibration information and temperature information through the communication circuit 11; the microprocessor 14 also retrieves the information about the loads of the spindle and feed axes in the numerical-controller internal information 15b, and sends a notification of an abnormal cutting load detected on the spindle to, for example, a display unit (not shown) attached to the numerical controller 10 so that the cutting load abnormality is indicated on the display unit.

The numerical controller 10 and the machine 30 controlled by the numerical controller 10 may cause various types of abnormal conditions due to dew condensation. In general, a motor controller for driving and controlling the spindle and feed axes of the machine 30, for example, has an analog circuit for detecting voltages and currents at their individual places.

If dew condensation occurs on the printed circuit board of the analog circuit in the motor controller, the insulation resistance of the surface of the printed circuit board is greatly reduced by the dew condensation. Then, leak current on the surface of the printed circuit board greatly increases and thereby the signal level of the analog circuit is changed, which may cause incorrect alarm detection or another abnormal condition.

In particular, the motor controller is often used in an environment in which dew condensation is likely to occur due to a large temperature difference; for example, the ambient temperature around the motor controller is high while the machine is being operated during the day because a power circuit for supplying driving electric power to the motor generates heat, the ambient temperature lowers at night during which the power is turned off, and the ambient temperature further lowers down to almost the temperature in the factory where the motor controller is installed. As for a machine tool, a coolant and cutting fluid used in a machining area may cause dew condensation, when they float in a misty state in a non-machining area, may cause dew condensation.

Figure 3:
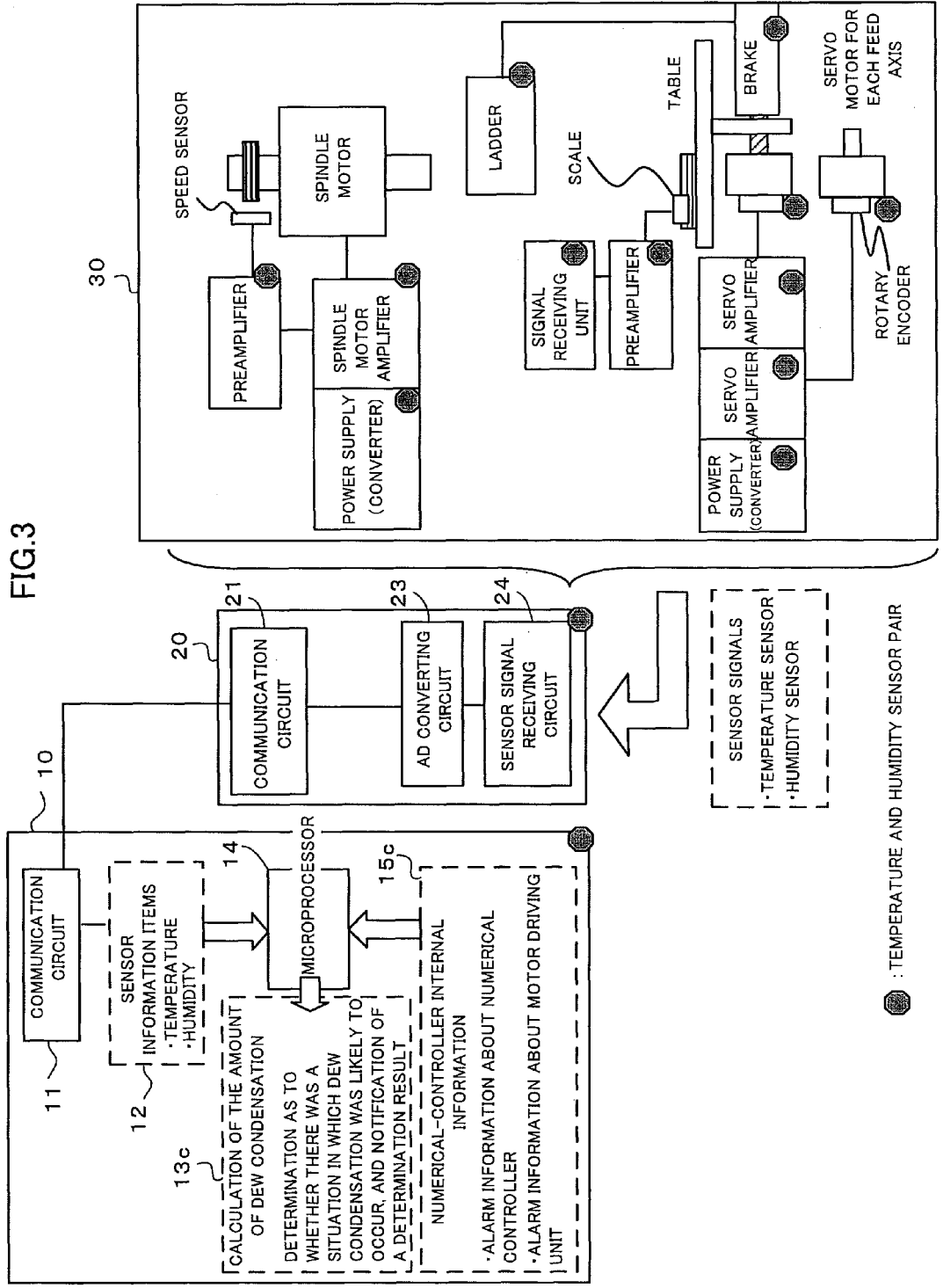
FIG. 3 illustrates another embodiment of the numerical controller according to the present invention, which can infer occurrence of dew condensation.

FIG. 3 illustrates another embodiment of the numerical controller according to the present invention, which can infer occurrence of dew condensation.

The detected temperature information and detected humidity information obtained from pairs of temperature sensors and humidity sensors (relative humidity sensors) disposed at individual places on the machine 30 are used to first calculate the amount of water vapor per unit volume around each pair of temperature sensor and humidity sensor at high temperature. Then, when the temperature drops, the amount of dew condensation is inferred at the dropped temperature from the relationship between temperature and the amount of saturated water vapor. This enables the possibility of occurrence of dew condensation at the individual places on the machine 30 to be quantitatively determined and thereby appropriate measures can be taken against dew condensation.

The machine 30 includes a spindle motor, a speed sensor for detecting the rotational speed of the spindle, a power supply and a spindle motor amplifier, which are used to rotate the spindle motor, a table on which workpieces are mounted, a scale for measuring an amount by which the table moves, servo amplifiers and a power supply (converter), which are used to move the table, and a rotary encoder for detecting the rotational positions of the servo amplifiers.

As shown in FIG. 3, one temperature sensor and one humidity sensors are paired and the sensor pair is attached to a place on the machine 30. Specifically, temperature and humidity sensor pairs are disposed at the preamplifier of the speed sensor, the power supply (converter), the spindle motor amplifier, the ladder, the signal receiving unit, the preamplifier of the linear scale, the power supply (converter) and the servo amplifiers, which are used to drive the table, the rotary encoder for detecting the rotational positions of the servo amplifiers that move the table, and the brake. A sensor formed by integrating a temperature sensor and a humidity sensor together may be used instead.

An output signal from the pair of temperature sensor and humidity sensor disposed at each place of the machine 30 is sent to the numerical controller 10 through the sensor signal relay unit 20. The microprocessor 14 in the numerical controller 10 calculates the amount of dew condensation generated near that place from the retrieved temperature information and humidity information as well as the alarm information about the numerical controller and alarm information about the motor driving unit in the numerical-controller internal information 15c. Then, a result of determination, from the calculated amount of dew condensation, as to whether there was a situation in which dew condensation was likely to occur is indicated on the display unit attached to the numerical controller.

For example, if an alarm is generated due to an abnormal speed sensor signal, when the possibility of dew condensation near the preamplifier for amplifying the speed sensor signal is high, it is determined from the detected information obtained from the temperature sensor and humidity sensor that the alarm is highly attributable to the dew condensation. Then, the determination result is indicated on, for example, the display unit of the numerical controller 10.

As for the servo motors for the feed axes as well, pairs of temperature sensor and humidity sensor are similarly disposed near the preamplifier separately disposed for scale signals, the signal receiving unit, the servo amplifiers (inverters), the power supply (converter) for the servo amplifiers, and the encoder for the motor so that the place of dew condensation can be located even when it occurs on any unit of any axis.

Since pairs of temperature sensor and humidity sensor are also disposed on the ladder and brake as shown in FIG. 3, even if a feed axis operates abnormally and thereby a servo-related alarm occurs as a result of an abnormal state of the brake for which the ladder operated abnormally due to dew condensation, the place of the dew condensation can be located.

Figure 4:
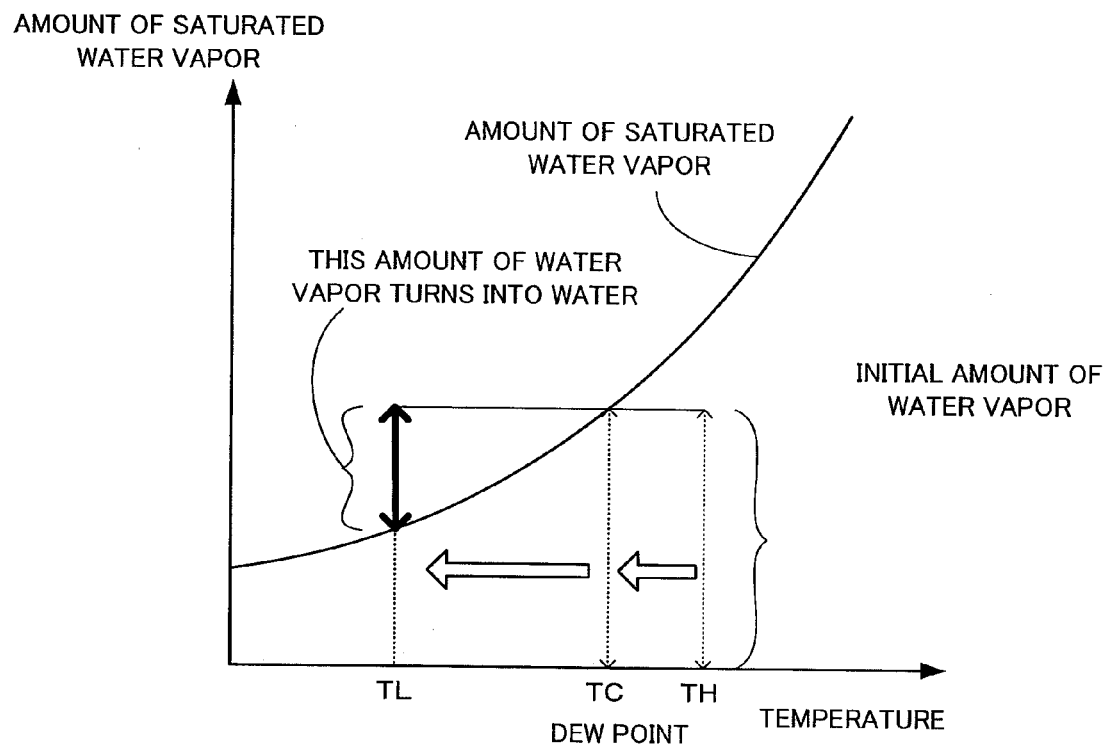
FIG. 4 is a graph illustrating the relationship between temperature and the amount of saturated water vapor.

Next, the relationship between temperature and the amount of saturated water vapor will be described with reference to FIG. 4. There is a limit to the amount by which air can include water vapor. The state in which water vapor is included up to the limit is referred to as a saturated state. The amount of water vapor in that state is the saturated amount of water vapor, which is indicated by the amount of water vapor in grams included in one cubic meter As shown in FIG. 4, the higher the air temperature (ambient temperature) is, the larger the saturated amount of water vapor is. Accordingly, the entire water vapor can be present as it is while the temperature is high. When, however, the temperature drops and the water vapor included in the air is saturated, the water vapor begins to condense and adheres to the surfaces of objects as water droplets. The temperature at which water droplets begin to be formed is referred to as the dew point.

Humidity can be calculated according to equation (1) below.

$$\text{Humidity} = \frac{\text{Amount of water vapor included in the air}}{\text{Saturated amount of water vapor at the temperature}} \times 100 \quad (1)$$

Equation (1) can be rewritten as equation (2).

$$[\text{Amount of water vapor included in the air}] = [\text{Saturated amount of water vapor at the temperature}] \times \text{humidity}(\%)/100 \quad (2)$$

Temperature TH in FIG. 4 indicates high temperature (temperature at a time when the machine is powered off). The amount of water vapor per unit volume at the high temperature (temperature TH) is calculated from the temperature information obtained from the temperature sensor, the humidity information obtained from the humidity sensor, and the relationship between temperature and the saturated amount of water vapor, according to equation (2) above.

After a machine tool such as the machine 30 is stopped upon completion of working for a day, the amount of water vapor per unit volume at low temperature (temperature TL) is calculated from, for example, the temperature information, humidity information, and the saturated amount of water vapor at a time when the machine is turned on in the morning on the next day, according to equation (2) above. A difference (differential amount of water vapor) in the amount of water vapor between the high temperature (TH) and low temperature (TL) can be inferred to condense. It can also be considered that, at night, the temperature further drops below the low temperature (TL) at a time when the machine is restarted in the morning on the next day. Even in this case, the amount of dew condensation can be inferred from the temperature information, humidity information, and the saturated amount of water vapor at the low temperature (TL).

In general, humidity sensors are classified into two types, that is, relative humidity sensors that output information about relative humidity (%) indicating a ratio of the amount of water vapor in the air to the saturated amount of water vapor in percent and absolute humidity sensors that output information about absolute humidity ($g/m^3$) indicating the amount of water vapor included in one cubic meter of air. When absolute humidity sensors are used, a differential amount of water vapor can be obtained from a difference between an absolute humidity ($g/m^3$) obtained when the machine is powered off and another absolute humidity (g/m³) obtained when the machine is powered on, and thereby the amount of dew condensation can be inferred.

It is also possible to infer that the amount of water vapor inferred from relative humidity sensors or absolute humidity sensors completely turns into dew condensation. However, the ratio of the actual amount of dew condensation to the calculated amount of differential water vapor varies with the place on the machine where the relative humidity sensors or absolute humidity sensor are disposed or with the environmental conditions of the factory where the machine is installed. Accordingly, a conversion coefficient, which has been obtained in advance, may be used to accurately infer the amount of dew condensation.

Since the amount of water in dew condensation can be inferred in various places on the machine 30, the environmental conditions of the machine 30, which is installed in any of various factory environments, can be figured out, so locations at which dew condensation must be prevented can be determined. Measures such as addition of a waterproof means can be taken at places on the machine 30 where much dew condensation otherwise would occur.

Figure 5:
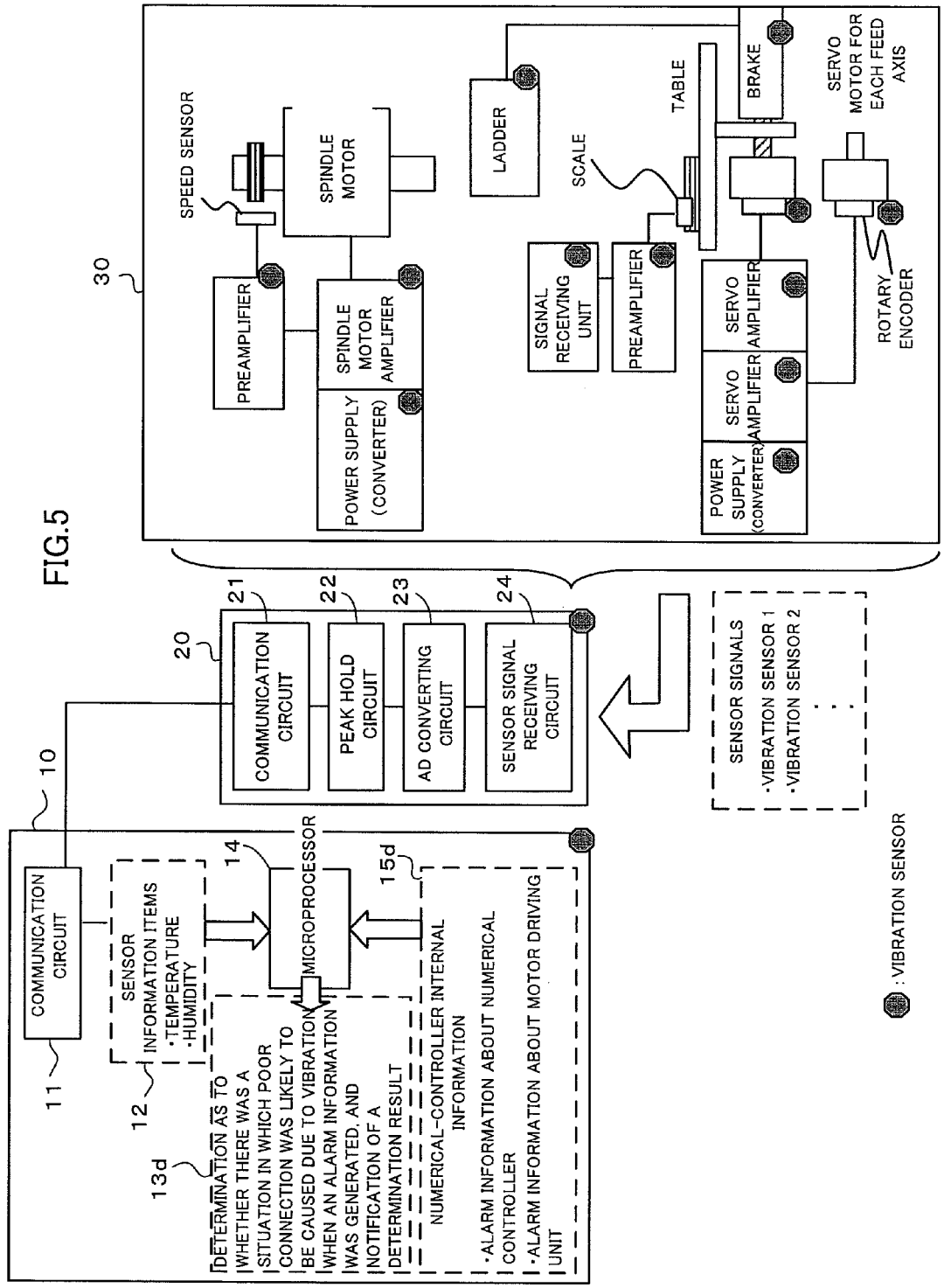
FIG. 5 illustrates yet another embodiment of the numerical controller according to the present invention that determines there was a situation in which an electric signal connection cable was likely to cause poor connection due to vibration from a detected vibration value obtained from a vibration sensor and the internal alarm information about the numerical controller.

FIG. 5 illustrates yet another embodiment of the numerical controller according to the present invention that determines there was a situation in which an electric signal connection cable was likely to cause poor connection due to vibration from a detected vibration value obtained from a vibration sensor and internal alarm information about the numerical controller.

In the numerical controller 10 and the machine 30 controlled by the numerical controller 10, various types of abnormal conditions may be caused by vibration. If, for example, the receiving circuit, which receives rotational position signals from the motor of the motor driving unit, undergoes vibration exceeding its tolerance level, the connector connection of the receiving circuit becomes loose and thereby a poor contact is made. In this case, since rotational position data of the motor cannot be correctly obtained, the motor driving unit generates an alarm.

With the numerical controller, in the present invention, which detects vibration information, the degree of vibration exerted on the receiving circuit is correctly figured out by detecting the vibration with a plurality of vibration sensors disposed at various places on the machine. If the degree of the vibration exerted on the receiving circuit exceeds the tolerance level up to which the receiving circuit can withstand vibration and if the motor driving unit generates an alarm due to the inability to correctly receive rotational position data of the motor, it can be determined that the receiving circuit has caused a loose connector connection or another abnormal condition attributable to the vibration.

In the numerical controller 10, signals controlled by relays having a mechanical contact may be used as control signals. If a relay undergoes vibration exceeding its tolerance level, the relay contact is momentarily opened, causing poor connection. When this happens, the control signal is broken and then the numerical controller 10 generates an alarm. Even in this case, it can be determined from information obtained from the plurality of vibration sensors disposed at the various places on the machine that the relay underwent vibration excessively exceeding its tolerance level and then an abnormal condition occurred.

When a plurality of vibration sensors used for determination are disposed in advance at places where an abnormal condition caused by vibration may be caused and an allowed vibration level to be applied only to the place where the vibration sensor is disposed is set in advance for each vibration sensor in the numerical controller 10, abnormal conditions caused by vibration can be identified.

When the machine becomes abnormal due to vibration, various alarms are generated depending on the signal that undergoes vibration and the place on the machine, so it has been difficult to identify the cause of the alarm. This embodiment can decide an abnormal condition by quantitatively determining the place and level of vibration exerted on the machine, enabling the cause of the alarm to be easily identified and prolonging the operating time of the machine.

As shown in FIG. 5, vibration sensors are disposed in the machine 30 and near units that may malfunction due to vibration in the machine electric power panel, particularly units that have signal line connectors and electric circuits including switching circuits switched by relays and other mechanical contacts.

In FIG. 5, vibration sensors are disposed near the preamplifier for speed sensor signals, the spindle motor amplifier (inverter), and the spindle amplifier power supply (converter) as devices related to the spindle because connectors are used to connect signal lines among these devices.

Other vibration sensors are disposed near the preamplifier scale signals, signal receiving unit, servo motor amplifier (inverter), servo amplifier power supply (converter), and motor encoder as devices related to the feed axes because connectors are used to connect signal lines among these devices as well. Accordingly, the place of vibration can be identified even when it occurs in any unit.

For example, when an alarm related to an abnormal scale signal is generated, if vibration near the receiving unit for the scale signal is found to have exceeded its tolerance value from information obtained from the relevant vibration sensor, it is determined that poor connection is highly likely to be caused by vibration. Then, the determination result can be indicated on, for example, the display of the numerical controller 10.

The ladder and brake in FIG. 5 are also provided with vibration sensors. Accordingly, even if a connector for brake control signals on the ladder causes poor connection and the brake becomes abnormal, which prevents the feed axes from operating normally and thereby causes a servo-related alarm, this problem can be addressed.

The invention claimed is:

1. A numerical controller for controlling a machine, comprising:
   temperature sensors and relative humidity sensors which are disposed, being placed close together, at individual places of the machine and configured to monitor states of the individual places, or absolute humidity sensors which are disposed at individual places of the machine so as to monitor states of the individual places; and
   an abnormality determining unit for determining whether the machine is normal or abnormal from detected temperature information and detected relative humidity information obtained from at least one temperature sensor and at least one relative humidity sensor, from among the temperature sensors and the relative humidity sensors which are disposed, being placed close together, at individual places of the machine, or detected absolute information obtained from the absolute humidity sensors which are disposed at individual places, and internal information about the numerical controller which includes at least any one of alarm information about a motor driving unit and alarm information about the numerical controller;
   wherein the detected temperature information and detected relative humidity information at a time when the machine is powered off and at a time when the machine is powered on are obtained from the temperature sensor and the relative humidity sensor which are disposed, being placed close together, at individual places of the machine so as to monitor states of the individual places, or the absolute humidity information at a time when the machine is powered off and at a time when the machine is powered on is obtained from the absolute humidity sensors which are disposed at individual places of the machine so as to monitor states of the individual places; and wherein the abnormality determining unit has a dew condensation occurrence inferring means configured to use detected temperature information obtained from the temperature sensor, detected relative humidity information obtained from the relative humidity sensor, and a relational equation for temperature and an amount of saturated vapor or uses absolute humidity information obtained from the absolute humidity sensors, resulting in a difference in the amount of water vapor per unit volume in air being obtained between at a time when the machine is powered off and at a time when the machine is powered on as a differential amount of water vapor, and then infers occurrence of dew condensation at a time when the machine is powered on from the obtained differential amount of water vapor; and if the dew condensation inferring means infers occurrence of dew condensation when the alarm information about the motor driving unit or the alarm information about the numerical controller, which are the internal information, is generated, a determination can be made indicating a place of the machine where the temperature sensor and the relative humidity sensor are disposed or where the relevant absolute humidity sensor is disposed is abnormal and the dew condensation is handled as a candidate cause of the alarm information.

2. A numerical controller for controlling a machine, comprising:

a plurality of vibration sensors which are disposed at individual places of the machine so as to monitor states of the individual places; and an abnormality determining unit for determining whether the machine is normal or abnormal from detected information obtained from at least one vibration sensor, from among the plurality of absolute humidity sensors, and internal information about the numerical controller which includes at least any one of alarm information about a motor driving unit and alarm information about the numerical controller; wherein the abnormality determining unit determines whether there was a situation in which an electric signal connection cable was to cause a poor connection due to vibration when the alarm information about the motor driving unit or the alarm information about the numerical controller, which are the internal information, was generated, from detected vibration information obtained from the plurality of vibration sensors and the alarm information.

* * * * *